ив011514557B2

United States Patent
Jeon et al.

(10) Patent No.: US 11,514,557 B2
(45) Date of Patent: Nov. 29, 2022

(54) METHOD AND APPARATUS OF RECOVERING IMAGE

(71) Applicant: RESEARCH & BUSINESS FOUNDATION SUNGKYUNKWAN UNIVERSITY, Suwon-si (KR)

(72) Inventors: Byeung Woo Jeon, Suwon-si (KR); Jae Lin Lee, Suwon-si (KR); Gyo Heak Oh, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 99 days.

(21) Appl. No.: 17/106,556

(22) Filed: Nov. 30, 2020

(65) Prior Publication Data
US 2021/0166357 A1  Jun. 3, 2021

(30) Foreign Application Priority Data
Nov. 29, 2019  (KR) .......................... 10-2019-0156409

(51) Int. Cl.
*G06T 5/00* (2006.01)
*H04N 5/235* (2006.01)
*H04N 5/04* (2006.01)

(52) U.S. Cl.
CPC .............. *G06T 5/003* (2013.01); *H04N 5/04* (2013.01); *H04N 5/2351* (2013.01); *H04N 5/2354* (2013.01); *H04N 5/2357* (2013.01); *G06T 2207/20201* (2013.01)

(58) Field of Classification Search
CPC ........... G06T 5/003; G06T 2207/20201; G06T 2207/10016; G06T 2207/30236; G06T 5/50; G06T 5/002; H04N 5/04; H04N 5/2351; H04N 5/2354; H04N 5/2357
See application file for complete search history.

(56) References Cited

FOREIGN PATENT DOCUMENTS

JP  2009-522825 A  6/2009
JP  2009-272756 A  11/2009

OTHER PUBLICATIONS

Motion deblurring with temporally coded illumination in an LED array microscope (Chenguang Ma et al) (Year: 2015).*
Ma, Chenguang, et al., "Motion deblurring with temporally coded illumination in an LED array microscope", Optics letters, vol. 40, No. 10, May 15, 2015 (pp. 2281-2284).
Korean Office Action dated Sep. 3, 2020 in counterpart Korean Patent Application No. 10-2019-0156409 (6 pages in Korean).

* cited by examiner

Primary Examiner — Yogesh K Aggarwal
(74) Attorney, Agent, or Firm — NSIP Law

(57) ABSTRACT

The present disclosure relates to a method of recovering an image from which a motion blur is removed and an image recovering apparatus and the image recovering apparatus according to an exemplary embodiment of the present disclosure includes a signal generator which receives at least one of illuminance information and speed information from a sensor to determine a random flickering pattern and a triggering signal based on the received signal, output the determined random flickering pattern to a lighting unit, and output the triggering signal to a camera; and an image processor which receives an image including a motion blur from the camera to recover the received image based on the random flickering pattern determined by the signal generator.

15 Claims, 11 Drawing Sheets

<Prior Art>

[FIG. 2B]

AMBIENT LIGHT IS CONSIDERED AND CODED LIGHT SOURCE IS USED

ACQUIRED IMAGE

IMAGE RECOVERED ACCORDING TO METHOD UTILIZING HIGH SPEED CAMERA

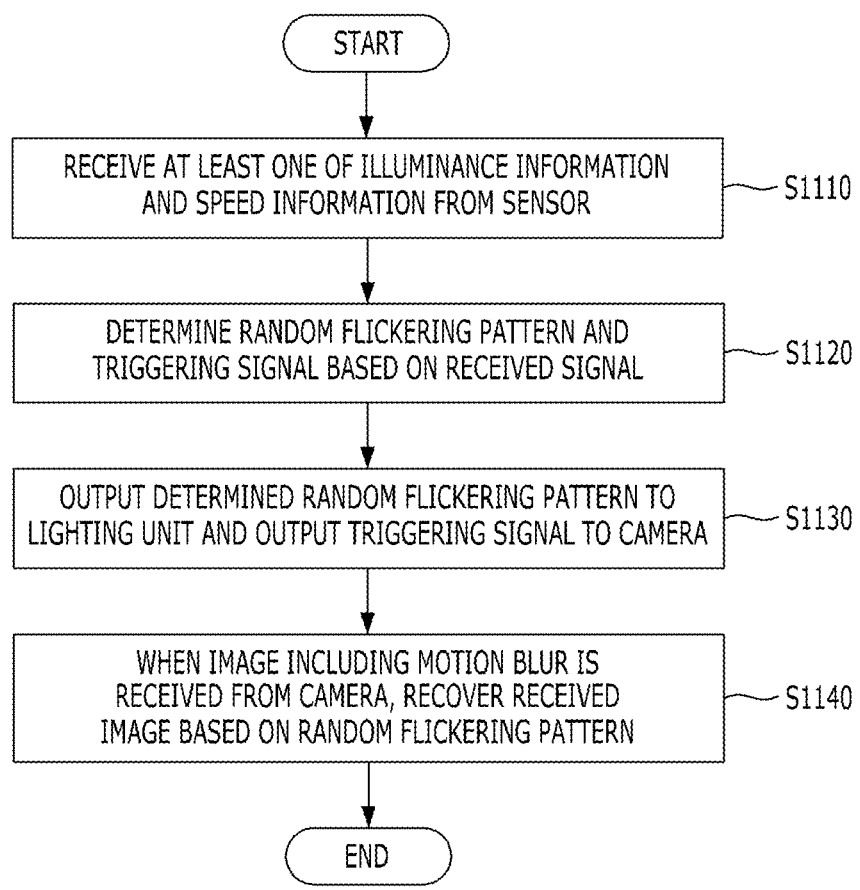

METHOD AND APPARATUS OF RECOVERING IMAGE

CROSS-REFERENCE TO RELATED APPLICATIONS

This application claims the priority of Korean Patent Application No. 10-2019-0156409 filed on Nov. 29, 2019, in the Korean Intellectual Property Office, the disclosure of which is incorporated herein by reference.

BACKGROUND

Field

The present disclosure relates to a method and an apparatus of recovering an image to solve a motion blur from an image obtained by capturing a moving object.

Description of the Related Art

In the field of image recovering, various methods are being studied to solve a motion blur caused due to the movement of an object.

In order to solve the motion blur, when a high speed camera with a fast frame rate is utilized, a clear texture image may be acquired. However, an exposure time (or a shutter speed) of a camera shutter is short so that a brightness of the entire image is dark so that an influence of a noise is relatively increased, which may degrade image quality.

Further, there is a method of utilizing a pattern used to control the shutter when an image is recovered after installing a shutter which flickers at a high speed in front of a general camera. In this case, a high speed operating shutter which is synchronized with a shutter timing of the camera needs to be added so that it is difficult to reduce the size of the entire system.

Further, when the image is recovered after adding a coded light source which operates at a high speed separately from the general camera, a pattern used to control an illumination device may be utilized. Here, a coded light source may refer to a light source (that is, a lighting device) which operates in accordance with a random flickering pattern at the outside of the camera. In this case, the recovering performance may be improved at a low illuminance, but in a general illuminance environment, the influence of ambient light other than the coded light source is increased so that when the image is recovered with a pattern used to control the coded light source, the image may be degraded due to the added ambient light component.

In the meantime, according to a method of adding a shutter or a lighting device, a length of a pattern used to control the shutter or the lighting device may be arbitrarily determined. If a length of the pattern is different from a length of a motion blur, when the image is recovered in order to match the length of the pattern and the length of the motion blur, a process of extending or reducing the image by one of interpolation and decimation is inevitably accompanied. Therefore, the image recovering performance may be degraded.

SUMMARY

An object of the present disclosure is to propose an image recovering method in accordance with surrounding environments by a normal camera, a coded light source, and environment information during a process of capturing and acquiring an image. Specifically, according to an exemplary embodiment disclosed in the present disclosure, a motion blurred image acquired by the normal camera is recovered to acquire a clear image.

Technical problems of the present disclosure are not limited to the above-mentioned technical problem(s), and other technical problem(s), which is (are) not mentioned above, can be clearly understood by those skilled in the art from the following descriptions.

The present disclosure relates to a method of recovering an image from which a motion blur is removed and an image recovering apparatus. According to an aspect of the present disclosure, an image recovering apparatus includes a signal generator which receives at least one of illuminance information and speed information from a sensor to determine a random flickering pattern and a triggering signal based on the received signal, output the determined random flickering pattern to a lighting unit, and output the triggering signal to a camera; and an image processor which recovers the received image based on the random flickering pattern determined by the signal generator when an image including a motion blur is received from the camera.

Desirably, when the signal generator determines the random flickering pattern and the triggering signal based on the speed information, a length of the random flickering pattern may be determined in accordance with the speed information.

Desirably, when the signal generator determines the random flickering pattern and the triggering signal based on the illuminance information, the random flickering pattern which operates the lighting unit may be determined based on the influence of the ambient light.

Desirably, the random flickering pattern may be a point spread function (PSF) pattern.

Desirably, the image recovering apparatus may further include a database which stores a plurality of PSF patterns, and the PSF pattern determined by the signal generator may be one of the plurality of PSF patterns stored in the database.

Desirably, the random flickering pattern output to the lighting unit and the triggering signal output to the camera may be synchronized.

Desirably, when the illuminance information is received, the image processor may predict a degradation model of the ambient light when the camera captures an image, based on the received illuminance information, and recover the received image using a prediction result.

Desirably, when the received image includes a plurality of frames, the image processor may predict a degradation model of the ambient light when the camera captures an image, using the plurality of frames, and recover the received image based on the prediction result.

Desirably, the image processor may recover the image based on the random flickering pattern and the pseudo inverse matrix of the received image.

Desirably, the signal generator and the image processor may be physically spaced apart from each other.

Another aspect of the present disclosure, an image recovering method includes: receiving at least one of illuminance information and speed information from a sensor by a signal generator of an image recovering apparatus; determining a random flickering pattern and a triggering signal based on the received signal by the signal generator of the image recovering apparatus; outputting the determined random flickering pattern to the lighting unit and outputting the triggering signal to the camera by the signal generator of the image recovering apparatus; and when an image including a motion blur is received from the camera, recovering the received image based on the random flickering pattern by the image processor of the image recovering apparatus.

Desirably, when the speed information is received from the sensor, the step of determining a random flickering pattern and a triggering signal may include a step of determining a length of the random flickering pattern in accordance with the speed information.

Desirably, when the illuminance information is received from the sensor, the step of determining a random flickering pattern and a triggering signal may include a step of determining a random flickering pattern of the lighting unit by ambient light.

Desirably, the recovering of the received image may include receiving illuminance information from the sensor, predicting a degradation model of ambient light when the camera captures an image, based on the received illuminance information, and recovering the received image using the prediction result.

Desirably, the recovering of the received image may include, when the received image includes a plurality of frames, predicting a degradation model of ambient light when the camera captures an image, using a plurality of frames, and recovering the received image using the prediction result, by the image processor.

According to an exemplary embodiment of the present disclosure, an image recovering apparatus predicts a PSF pattern with a good invertibility based on at least one of speed information and illuminance information, generates a random flickering pattern based on the PSF pattern, and controls a lighting unit installed at the outside of the camera to operate with a generated PSF pattern. Further, the image recovering apparatus acquires and recovers an image which is modulated with the predicted PSF pattern based on the generated PSF pattern. Therefore, the image recovering performance may be improved without adding a separate device in the camera.

According to an exemplary embodiment of the present disclosure, a camera such as an existing CCTV and expensive equipment may be recycled and a performance of a latest product may be further improved. Further, a lighting unit at the outside of the camera is used so that the image recovering performance may be improved regardless of the illuminance environment.

The effects of the present disclosure are not limited to the aforementioned effects, and various other effects are included within a range which is obvious to those skilled in the art from the following description.

BRIEF DESCRIPTION OF DRAWINGS

The above and other aspects, features and other advantages of the present disclosure will be more clearly understood from the following detailed description taken in conjunction with the accompanying drawings, in which:

FIGS. 2A and 2B are views for explaining a square wave function and a signal of a flickering pattern which is randomly coded in a spatial domain and a frequency domain;

FIG. 11 is a flowchart for explaining an image recovering method according to another exemplary embodiment of the present disclosure.

DETAILED DESCRIPTION OF THE EMBODIMENT

Figure 1:
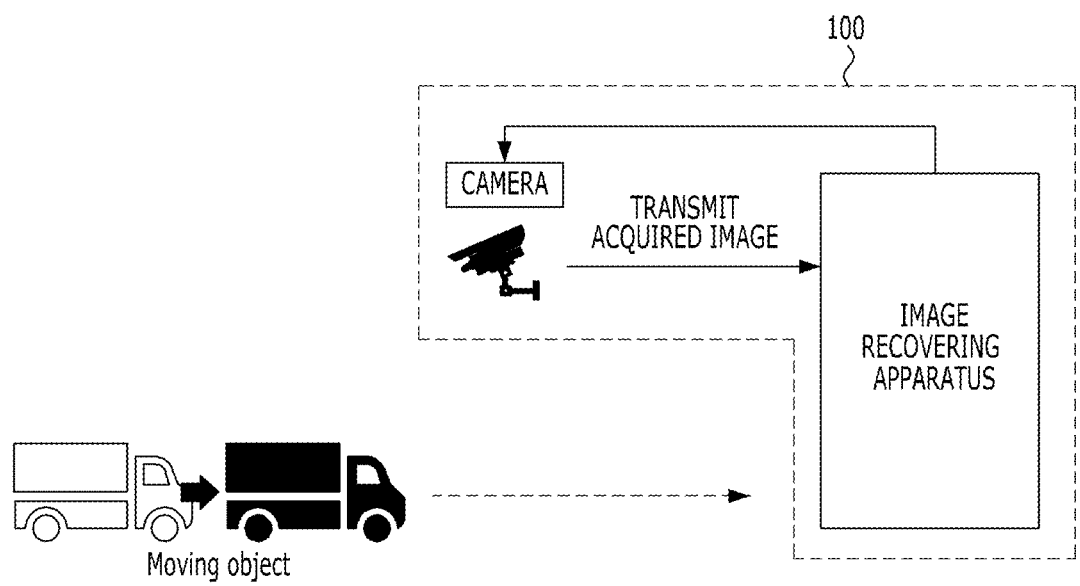
FIG. 1 is a view for explaining an image recovering apparatus of the related art.

Those skilled in the art may make various modifications to the present disclosure and the present disclosure may have various embodiments thereof, and thus specific embodiments will be illustrated in the drawings and described in detail in the detailed description. However, it should be understood that the present disclosure is not limited to the specific embodiments, but includes all changes, equivalents, or alternatives which are included in the spirit and technical scope of the present disclosure. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present disclosure, a first component may be referred to as a second component, and similarly, a second component may be referred to as a first component. The term "and/or" includes combinations of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment, but are not intended to limit the present disclosure. A singular form may include a plural form if there is no clearly opposite meaning in the context. In the present application, it should be understood that term "include" or "have" indicates that a feature, a number, a step, an operation, a component, a part or the combination of those described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present disclosure.

Hereinafter, exemplary embodiments according to the present disclosure will be described in detail with reference to accompanying drawings.

FIG. 1 is a view for explaining an image recovering apparatus of the related art.

The image recovering apparatus is a technology of modeling a degradation function generated during the image capturing and recovering an original image obtained by removing an influence of a motion blur from the blurred image based on the modeling result. The image recovering apparatus may be one component of the image recovering system 100 and the image recovering system 100 may further include a camera in addition to the image recovering apparatus.

As illustrated in FIG. 1, if it is assumed to capture a vehicle which is driven in one direction on the road at a high speed, the motion blur is generated in accordance with a time when the shutter is exposed so that the image recovering system may acquire a blurred image. In this case, the blurred image g(x, y) may be expressed by the following Equation 1.

$$g(x,y)=H[f(x,y)]+\eta(x,y) \quad \text{[Equation 1]}$$

Here, f(x,y) is an original image without having a motion blur, η(x,y) is a noise function, and H is a degradation function. According to Equation 1, when a lot of information about degradation functions H and noise functions η(x,y) is provided, it is understood that the blurred image may be recovered to be close to the original image. If it is assumed that the degradation function H is linear and spatially invariant, Equation 1 may be expressed by the following Equation 2.

$$g(x,y)=h(x,y)*f(x,y)+\eta(x,y) \quad \text{[Equation 2]}$$

Here, h(x,y) is an expression of a spatial domain of the degradation function and * refers to a convolution function. An expression of a frequency domain with regard to this may be expressed by the following Equation 3.

$$G(u,v)=H(u,v)F(u,v)+N(u,v) \quad \text{[Equation 3]}$$

H(u,v) is an expression of a frequency domain of the degradation function.

The camera stores an image acquired while the shutter is open at every frame, in an image sensor, and then outputs the image to the image recovering apparatus. That is, the blurred image g(x,y) may be expressed by a convolution of the original image f(x,y) and the degradation function h(x,y) for a degradation model generated while the shutter of the camera is open. Here, the degradation model may vary by a shutter of the camera, a movement of the camera, and a movement of the object.

That is, the camera acquires images while the shutter is open so that the degradation function h(x,y) may be considered as a square wave function by reflecting the shutter of the camera. Accordingly, in the related art, when the degradation function was modeled, the square wave function was utilized.

In the meantime, in Equation 3, an exact value of the noise cannot be known so that if variables other than a noise factor are summarized with respect to the original image F(u,v), the variables may be expressed with Equation 4.

$$F(u,v)=\frac{G(u,v)}{H(u,v)} \quad \text{[Equation 4]}$$

In the above Equation, if a variance value of H(u,v) which is a domain expression of the degradation function is small and a minimum value of the signal is large, the frequency characteristic is good, so that the recovering performance may be improved. However, in the case of the degradation function in which the camera shutter is reflected as a square wave, a result obtained by converting to the frequency domain includes 0 and the degradation function is a sinc function type, so that it is difficult to say that the frequency characteristic is good. Accordingly, a technique with an improved recovering performance as compared with a traditional method which utilizes a square wave function is being studied.

Figure 2A:
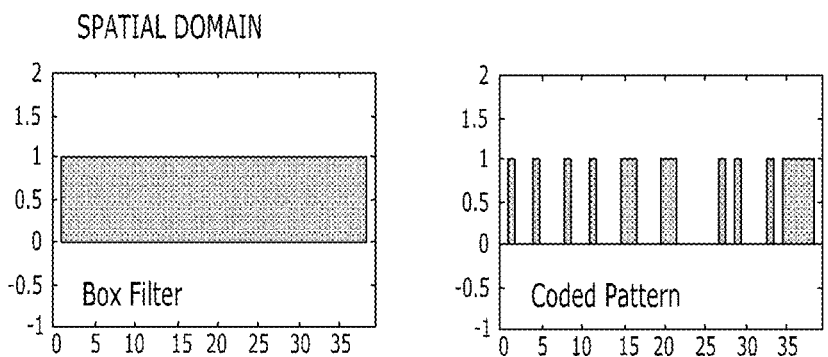
Figure 2A:
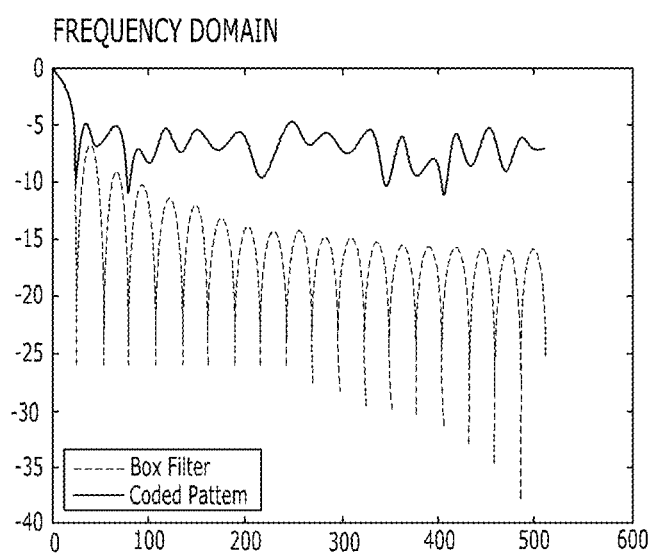

FIGS. 2A and 2B are views for explaining a square wave function and a signal of a flickering pattern which is randomly coded in a spatial domain and a frequency domain.

A typical camera shutter operation may be represented by a square wave function consisting of 0 and 1. In the meantime, a model with a good frequency characteristic may be a random binary pattern and a modified uniformly redundant array (MURA) is one of the patterns which are used in a coded aperture imaging field.

In other words, the degradation function h(x,y) is modulated into a point spread function with a good frequency characteristic to improve the recovering performance. If h(x,y) is modulated by a point spread function of the coded light source, the H(u,v) which is a frequency domain expression of the degradation function may be evaluated by an optical transfer function (OTF) which is a Fourier transform pair with the PSF.

In the meantime, FIG. 2A illustrates a square wave function and a random flickering pattern in a spatial domain and FIG. 2B illustrates two functions in a frequency domain.

Referring to FIG. 2B, when an operation of the camera shutter is expressed by a square wave pattern (box filter) in the spatial domain, it is confirmed that 0 is included in the frequency domain and a variance of the maximum value and the minimum value is large. However, when the operation of the camera shutter is expressed by a random flickering pattern (coded pattern), as compared with the square wave pattern, the variance of the maximum value and the minimum value in the frequency domain is small so that it is said that the frequency characteristic is good. Accordingly, the image recovering apparatus according to an exemplary embodiment of the present disclosure applies the random flickering pattern to the camera shutter to be utilized as a degradation model of the acquired image.

In the meantime, as a method for utilizing a random flickering pattern, a method of additionally mounting a separate shutter which operates at a high speed at the outside of the camera shutter and a method of installing a light source which operates at a high speed at the outside of the camera may be considered to be used.

Figure 3:
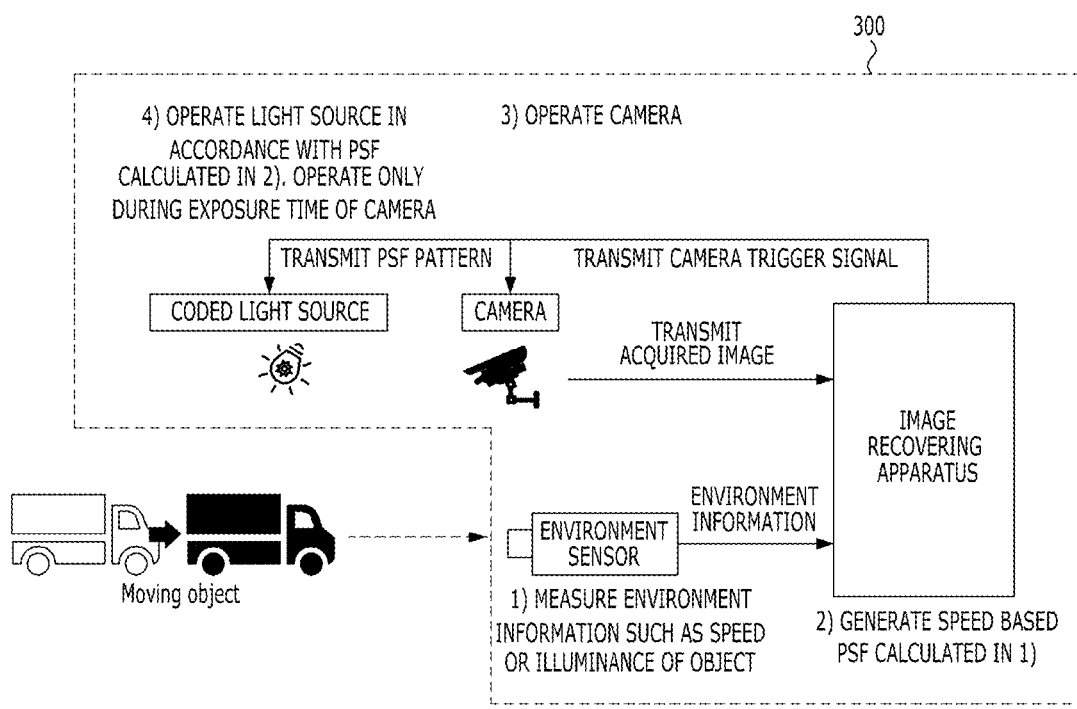
FIG. 3 is a view illustrating an image recovering apparatus according to an exemplary embodiment of the present disclosure.

FIG. 3 is a view illustrating an image recovering apparatus according to an exemplary embodiment of the present disclosure.

The image recovering apparatus according to the exemplary embodiment of the present disclosure predicts a point spread function (PSF) pattern with a good invertibility for ambient light, applies the random flickering pattern determined to have a good invertibility of ambient light as a flickering pattern of a coded light source, and utilizes the sequence of the ambient light which is modulated when the image is recovered as a degradation model to improve a recovering performance.

The image recovering apparatus according to the exemplary embodiment transmits a PSF signal to a coded light source and transmits a trigger signal to the camera. The ambient light needs to be flickered while exposing the shutter of the camera so that two signals are desirably synchronized.

In the meantime, an image acquired by the camera which operates with a synchronized signal and the coded light source is recovered by the image processing in the image recovering apparatus and specifically, when the image is recovered, a pseudo inverse matrix may be used, but the recovering method is not limited thereto.

In order to describe an exemplary embodiment which utilizes a pseudo inverse matrix, specifically, when a speed and a direction of a relative movement between a camera and a scene or a region of interest are constant, an acquired image i may be defined by a clear image s to be recovered and a PSF pattern A as represented in Equation 5.

$$i=sA+n \qquad \text{[Equation 5]}$$

Here, n represents a noise, which includes all noises (a dark noise, a read noise, etc.) due to a hardware configuration and noises (a quantization error, etc.) due to a software configuration. Even when the speed and the direction of the motion blur are not constant, the modeling may be performed based on Equation 5. If it is assumed that the influence of n is insignificant, the recovered clear image $\hat{s}$ may be recovered using a pseudo inverse matrix as represented by the following Equation 6.

$$\hat{s}=A^+i \qquad \text{[Equation 6]}$$

Here, A is a two-dimensional circulant PSF matrix in which a length and a pattern are optimized by illuminance information and speed information. In the image recovering method according to an exemplary embodiment, the better the invertibility of $A^\dagger$ used to recover the image, the better the recovering performance. The invertibility is determined in accordance with a conditional number of the matrix and the lower the conditional number of the matrix A, the better the invertibility. In other words, the lower the conditional number of the matrix, the better the invertibility of the matrix. When the invertibility of the matrix used to recover the image is good, the image recovering performance is improved. The recovered clear image $\hat{S}$ in Equation 6 may be recovered not only by $A^\dagger$, but also by another method. For example, $\hat{S}$ may be calculated by a conjugate gradient method.

In the meantime, a circulant PSF matrix will be described with reference to FIG. 4.

Figure 4:
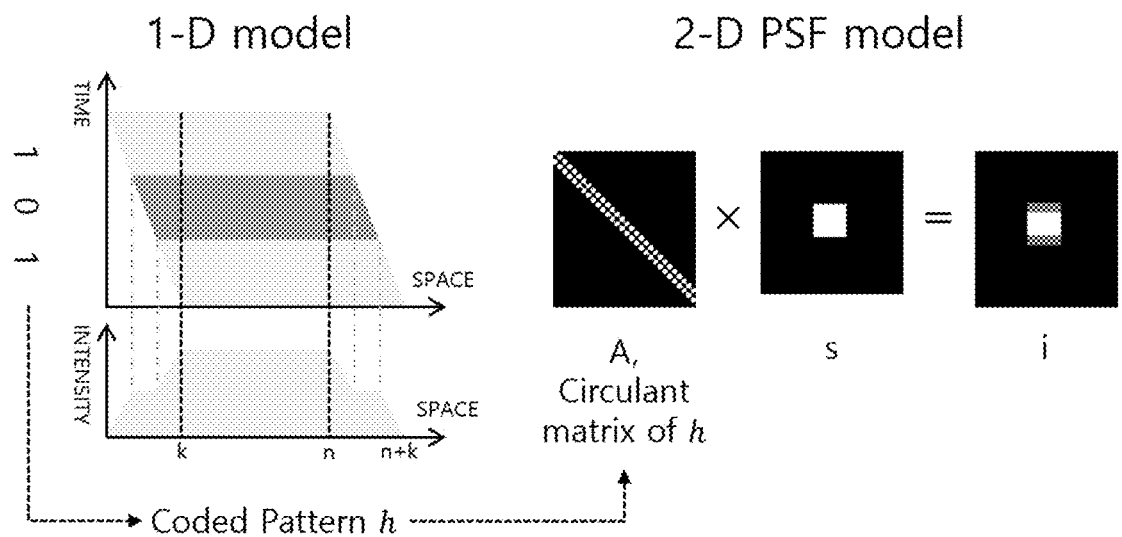
FIG. 4 is a view for explaining a circulant PSF matrix generated by an image recovering apparatus according to an exemplary embodiment of the present disclosure.

FIG. 4 is a view for explaining a circulant PSF matrix generated by an image recovering apparatus according to an exemplary embodiment of the present disclosure.

The image recovering apparatus according to the exemplary embodiment may further include a database which stores a plurality of PSF patterns and select one PSF pattern among the plurality of PSF patterns in accordance with speed information.

Referring to FIG. 4, the selected PSF circulates for every pixel one by one to become a two-dimensional PSF matrix. A circulating direction (x-axis, y-axis) is defined in accordance with a moving direction of a moving object. For example, when the moving object moves in a y-axis direction, one-dimensional PSF circulates in an x-axis direction for every pixel one by one to generate a two-dimensional circulant matrix.

Referring to FIG. 3 again, the image recovering apparatus according to the exemplary embodiment may generate a PSF pattern based on illuminance information and speed information.

Specifically, the image recovering apparatus according to the exemplary embodiment utilizes the illuminance information so that the PSF pattern may be generated in consideration of influence of ambient light when the image is acquired. Accordingly, as compared with the related art, a clearer image may be recovered.

Therefore, the image recovering apparatus according to the exemplary embodiment may employ a PSF pattern with the best invertibility by adding information of a coded light source to a brightness of the ambient light, an operation speed, and a pattern type of the light source of the image recovering system.

First, when the coded light source is used, a degradation model when it is influenced by the ambient light is defined as represented by the following Equation 7.

$$i=s(A_1+A_2)+n \qquad \text{[Equation 7]}$$

Here, $A_1$ is a random binary pattern which controls a coded light source, $A_2$ is a degradation model of ambient light excluding the influence of the coded light source, and $A_1$ uses a pattern when $A_1+A_2$ has the best frequency domain characteristic. That is, information of $A_2$ is necessary to optimize $A_1$.

In the meantime, information of $A_2$ may be acquired by various methods. First, there is a method of predicting and optimizing $A_2$ in the acquired image i using a device which is capable of acquiring illuminance information, such as spectrometer.

Alternatively, when it is assumed that an n-th image acquired from the camera using the coded light source is $i_n$, frames before n-th frame are analyzed or the n-th frame is analyzed to optimize ambient light information $A_2$ excluding the coded light source. The image recovering apparatus according to the exemplary embodiment may optimize $A_2$ using two analyzing methods by a device which is capable of acquiring illuminance information and an acquired image $i_r$ (r≤n) and then generate $A_1$ thereby.

Further, the image recovering apparatus according to the exemplary embodiment utilizes speed information so that the PSF pattern may be prepared by predicting a size of the motion blur and the image may be recovered without performing a separate interpolation or decimation process. Accordingly, the recovering performance may be improved.

In the acquired image i, when a length of a motion blur of the object is k and a length of the PSF pattern is m, if m≠k and m<k, the image may be decimated at a rate of m/k or the PSF pattern may be interpolated at a rate of k/m. However, when the size of the image or the PSF pattern is adjusted by the interpolation, information of the image or the PSF pattern may be lost or a performance of recovering an original image may be degraded. Further, according to the image recovering method of the related art, it is practically difficult to convert a resolution of the image for every frame according to a size of the motion blur.

However, the image recovering apparatus according to the exemplary embodiment acquires a speed and distance information of the object in advance based on the fact that the size of the motion blur and the speed are proportional to each other, so that it is possible to predict how much the motion blur is generated in the image.

Figure 5:
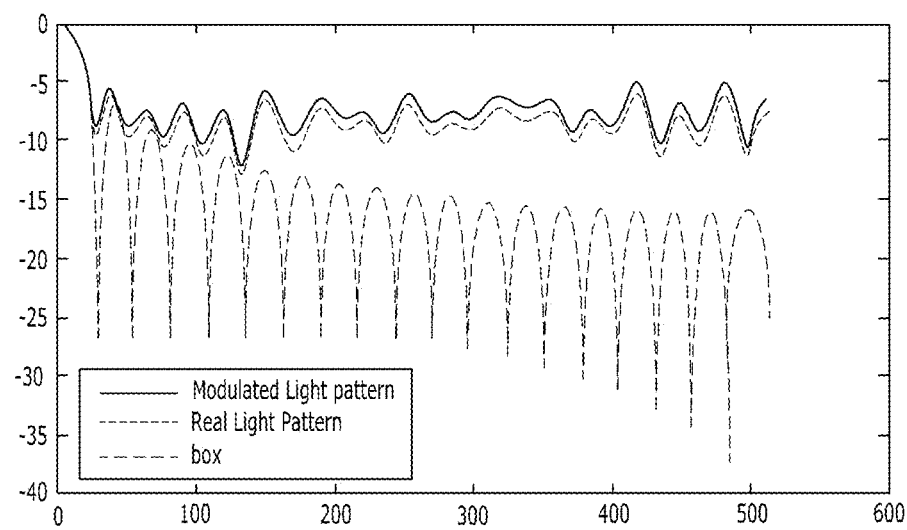
FIG. 5 is a view for explaining a frequency characteristic of a random flickering pattern determined by an image recovering apparatus according to an exemplary embodiment of the present disclosure.

FIG. 5 is a view for explaining a frequency characteristic of a random flickering pattern determined by an image recovering apparatus according to an exemplary embodiment of the present disclosure.

A graph of FIG. 5 denoted by "box" represents a frequency characteristic when the operation of the camera shutter is represented by a square wave, which shows the same characteristic as the box filter illustrated in FIG. 2B, so that a detailed description thereof will be omitted.

Further, a modulated light pattern of FIG. 5 represents an ambient light operation pattern which does not consider the ambient light excluding the coded light source. However, a real light pattern shows a frequency characteristic when the ambient light which is not considered in the modulated light pattern as disclosed in the present disclosure is added.

However, it is difficult to say that the real light pattern of FIG. 5 has a better frequency characteristic than the modulated light pattern. This is because when the optimal pattern calculated by the above-described Equation is applied to an actual situation, the frequency characteristic may be different from the characteristic which is assumed when the pattern is calculated and influences on the conditional number which determines the invertibility of the frequency.

Accordingly, in order to generate a real light pattern, the modulated light pattern needs to be generated in consideration of the existing ambient light. In other words, the performances of the optimal patterns need to be compared, rather than the performances of the modulated light patterns. Therefore, the image recovering apparatus according to the exemplary embodiment of the present disclosure further applies a random flickering pattern generated in consideration of the influence of the ambient light as well as the coded light source to the camera and utilizes the pattern as a degradation model of the acquired image.

Figure 6A:
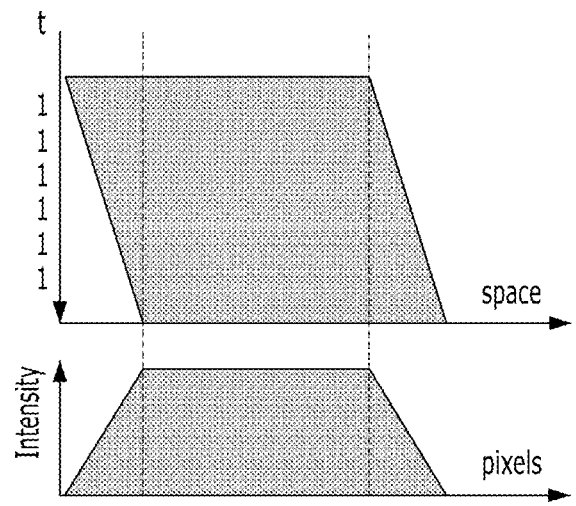
FIGS. 6A to 6C are views for explaining PSF modeling in accordance with a random flickering pattern by an image recovering apparatus according to another exemplary embodiment of the present disclosure.
Figure 6B:
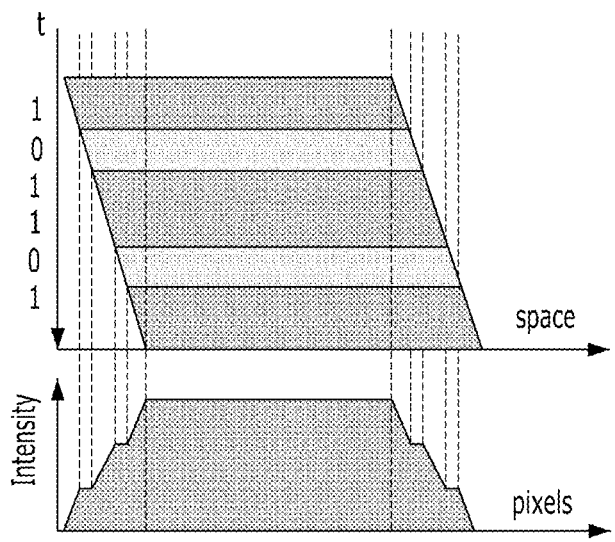
Figure 6C:
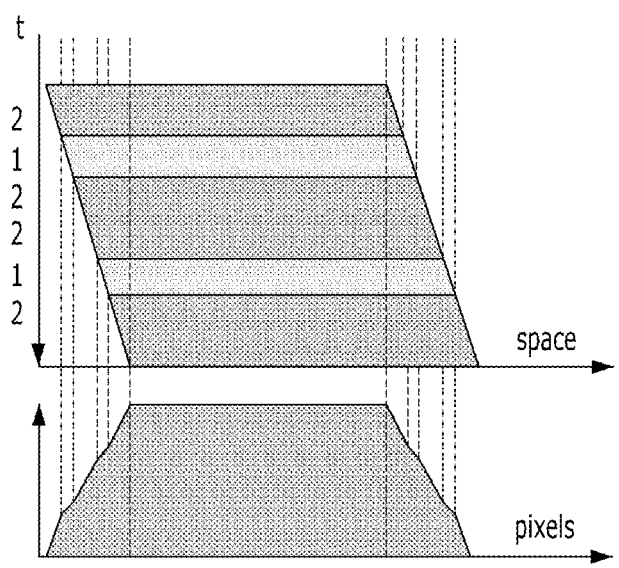

FIGS. 6A to 6C are views for explaining PSF modeling in accordance with a random flickering pattern by an image recovering apparatus according to another exemplary embodiment of the present disclosure.

In upper graphs of FIGS. 6A to 6C, an x axis denotes a space and a y axis denotes a PSF pattern. Further, in lower graphs of FIGS. 6A to 6C, an x axis denotes a pixel of the acquired image and a y axis denotes an intensity per pixel.

FIG. 6A illustrates a one-dimensional image acquired when ambient light excluding the coded light source is considered, FIG. 6B illustrates a one-dimensional image acquired by a camera when a coded light source is used, but ambient light excluding the coded light source is not considered. FIG. 6C illustrates a one-dimensional image when the ambient light is considered and used.

Referring to FIG. 6C, as compared with FIGS. 6A and 6B, it is confirmed that the intensity of the image is improved. Accordingly, like the image recovering apparatus according to the exemplary embodiment of the present disclosure, it is understood that when ambient light is used and the ambient image is considered, the intensity of the image is improved so that the recovering performance is also improved.

Figure 7:
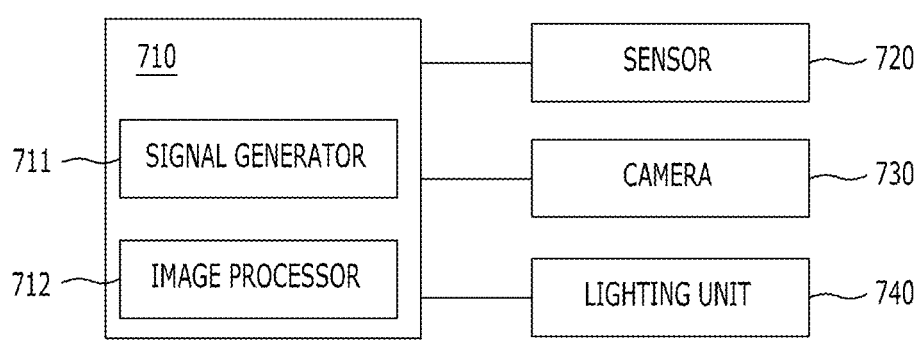
FIG. 7 is a block diagram illustrating an image recovering system according to an exemplary embodiment of the present disclosure.

FIG. 7 is a block diagram illustrating an image recovering system according to an exemplary embodiment of the present disclosure.

First, the image recovering system 700 includes an image recovering apparatus 710, a sensor 720, a camera 730, and a lighting unit 740.

The sensor 720 senses the environment in the vicinity of the camera 730 and includes an illuminance sensor and a speed sensor, but a type of sensors included in the sensor 720 is not limited thereto.

The camera 730 captures an image for the object and the lighting unit 740 receives a random flickering pattern from the image recovering apparatus 710 to perform the flickering. In the meantime, it is obvious to those skilled in the art that the coded light source described in the specification is the same component as the lighting unit 740 of FIG. 7.

In the meantime, the image recovering apparatus 710 includes a signal generator 711 and an image processor 712 and generates a random flickering pattern and a triggering signal which control the lighting unit 740 and the camera 730 and receives an image with a motion blur to recover the image as an image from which the influence of the motion blur is removed.

Specifically, the signal generator 711 receives at least one of the illuminance information and the speed information from the sensor 720 to determine the random flickering pattern and the triggering signal based on the received signal and output the determined random flickering pattern to the lighting unit 740 and output the triggering signal to the camera 730.

Here, when the signal generator 711 determines the random flickering pattern and the triggering signal based on the speed information, the length of the random flickering pattern may be determined in accordance with the speed information. That is, the signal generator 711 predicts the length of the motion blur which may be generated in the image based on the speed information in advance to optimize the random flickering pattern.

Further, when the signal generator 711 determines the random flickering pattern and the triggering signal based on the illuminance information, the random flickering pattern of the lighting unit may be determined based on the influence of the ambient light.

In the meantime, the random flickering pattern may be a point spread function (PSF). In this case, the image recovering apparatus 710 may further include a database which stores a plurality of PSF patterns and the PSF pattern determined by the signal generator 711 may be one of a plurality of PSF patterns stored in the database.

In the meantime, the random flickering pattern output to the lighting unit 740 and the triggering signal output to the camera 730 may be synchronized.

Further, when the image including a motion blur is received from the camera, the image processor 712 may recover the received image based on the random flickering pattern determined by the signal generator.

When the illuminance information is received, the image processor 712 predicts a degradation model of the ambient light when the camera 730 captures an image, based on the received illuminance information, and recovers the received image using a prediction result.

When the received image includes a plurality of frames, the image processor 712 predicts a degradation model of the ambient light when the camera 730 captures an image, using the plurality of frames, and recovers the received image based on a prediction result.

The image processor 712 may recover the image based on the random flickering pattern and the pseudo inverse matrix of the received image.

Figure 8:
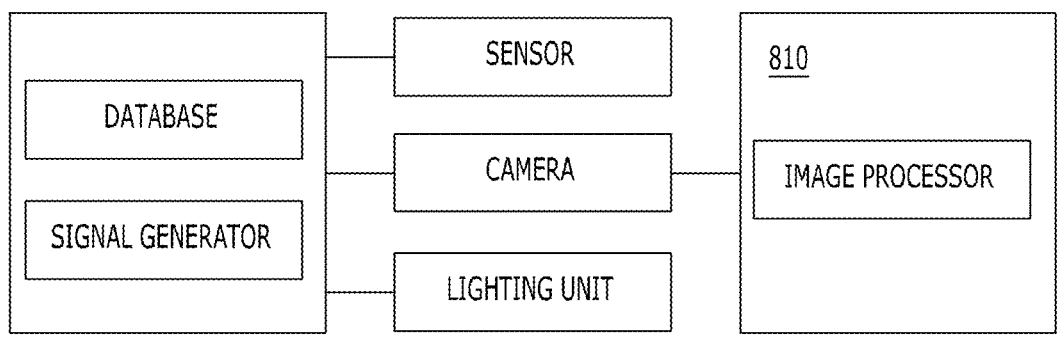
FIG. 8 is a block diagram illustrating an image recovering system according to another exemplary embodiment of the present disclosure.

FIG. 8 is a block diagram illustrating an image recovering system according to another exemplary embodiment of the present disclosure.

The signal generator and the image processor of the image recovering apparatus according to the exemplary embodiment may be physically spaced apart from each other. In the meantime, a sensor, a camera, and a lighting unit of FIG. 8 correspond to the sensor 720, the camera 730, and the lighting unit 740 of FIG. 7 so that a detailed description thereof will be omitted.

Referring to FIG. 8, the image processor may be included in a user computer 810. In this case, the signal generator and the database which stores a plurality of random flickering patterns and the image processor may be physically spaced apart from each other. The image processor receives an image from the camera to recover the image in accordance with the image recovering method according to the exemplary embodiments of the present disclosure.

Figure 9:
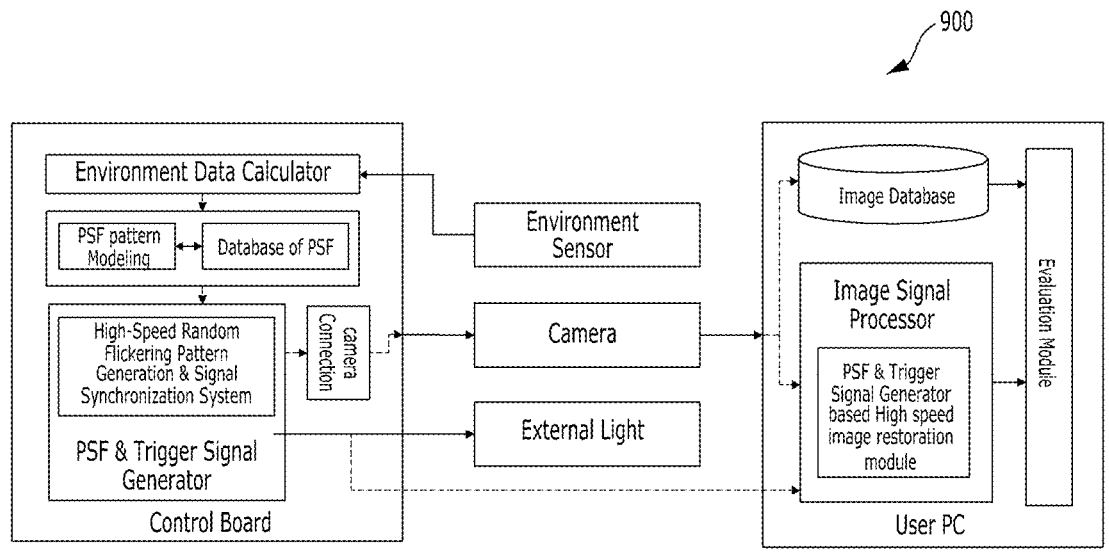
FIG. 9 is a block diagram for explaining an image recovering system according to another exemplary embodiment of the present disclosure.

FIG. 9 is a block diagram for explaining an image recovering system according to another exemplary embodiment of the present disclosure.

The image recovering system 900 of FIG. 9 has a structure in which a signal generator (PSF & trigger signal generator) and a database (database of PSF) which stores a PSF pattern are included in a control board and an image signal processor is included in a user PC. In the meantime, a sensor (environment), a camera, and a coded light source of FIG. 9 correspond to the sensor 720, the camera 730, and the lighting unit 740 of FIG. 7 so that a detailed description thereof will be omitted.

The user PC of FIG. 9 further includes an image database, which stores necessary images when a degradation model of ambient light is predicted based on the other frame at the time of recovering images, but the function of the image database is not limited thereto.

Figure 10A:
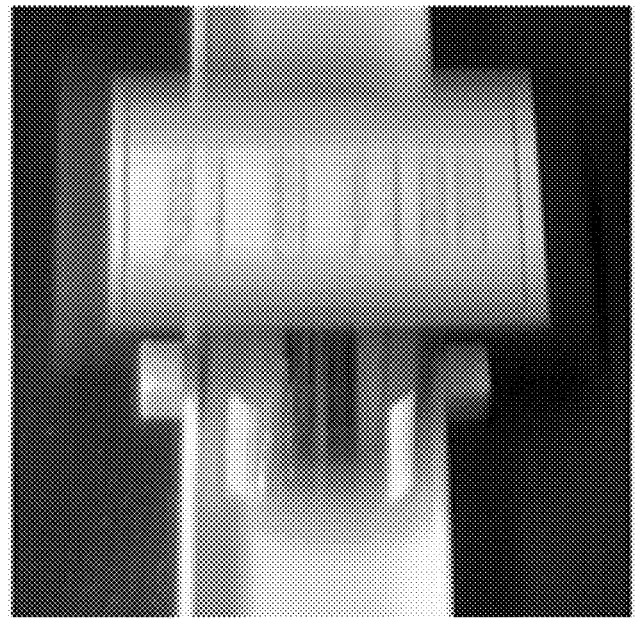
FIGS. 10A to 10C are views for explaining an image recovered by an image recovering apparatus according to an exemplary embodiment of the present disclosure.
Figure 10B:
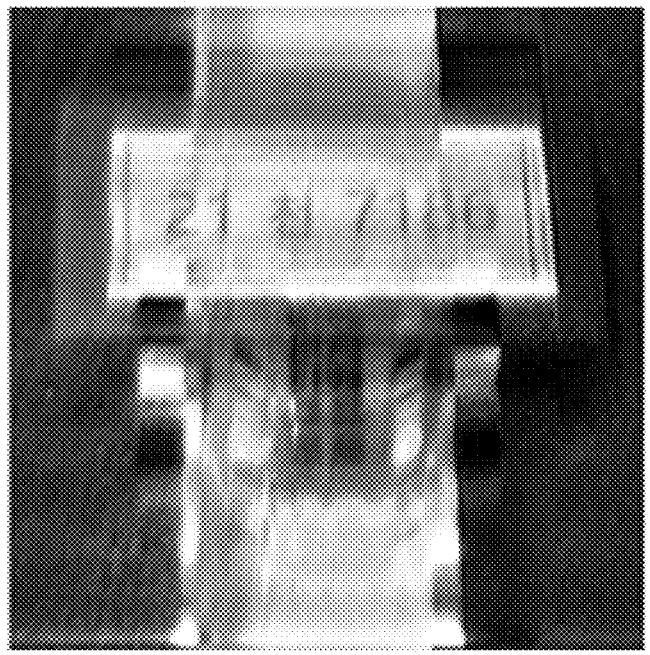
Figure 10C:
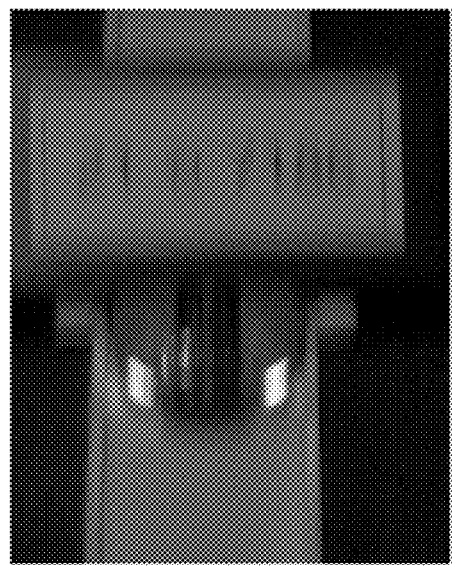

FIGS. 10A to 10C are views for explaining an image recovered by an image recovering apparatus according to an exemplary embodiment of the present disclosure.

FIGS. 10A to 10C are views illustrating an acquired image and a recovered image by utilizing an image recovering system which includes a coded light source which randomly flickers at a high speed and a camera with a timing synchronized with the coded light source. This experiment was performed by capturing an object with a constant moving speed in a dark room to control the influence of the illuminance.

FIG. 10A illustrates a 20 fps motion blur image obtained using a speed meter and it is difficult to identify letters on the object due to the motion blur generated by the movement of the object.

FIG. 10B illustrates an image recovered according to an exemplary embodiment. Specifically, FIG. 10B illustrates an image which is recovered by acquiring a modulated image based on the PSF pattern. The PSF pattern used at this time is "10011001010101101100010001101101000011' and has a blur size (39 pixels) similar to a predicted length (38 pixels) of the motion blur. As compared with FIG. 10A, in the image of FIG. 10B, the letters on the object may be relatively accurately identified.

In the meantime, FIG. 10C is an image captured by a high speed camera with a speed of 70 fps. As compared with FIG. 10A, the letters on the object may be identified better, but it is understood that the image is entirely dark due to the short exposure time of the shutter. In the meantime, as compared with FIG. 10B, the motion blur is significant.

FIG. 11 is a flowchart for explaining an image recovering method according to another exemplary embodiment of the present disclosure.

In step 1110, the signal generator of the image recovering apparatus receives at least one of illuminance information and speed information from the sensor.

In step 1120, the signal generator of the image recovering apparatus may determine a random flickering pattern and a triggering signal based on the received signal.

Here, when the speed information is received from the sensor, the step of determining a random flickering pattern and a triggering signal may include a step of determining a length of the random flickering pattern in accordance with the speed information.

When the illuminance information is received from the sensor, the step of determining a random flickering pattern and a triggering signal may include a step of determining a random flickering pattern based on the influence of ambient light by the lighting unit.

In step 1130, the signal generator of the image recovering apparatus outputs the determined random flickering pattern to the lighting unit and outputs the triggering signal to the camera.

In step 1140, when the image processor of the image recovering apparatus receives an image including a motion blur from the camera, the image processor may recover the received image based on the random flickering pattern.

Here, the step of recovering the received image may include a step of receiving illuminance information from the sensor, a step of predicting a degradation model of ambient light when the camera captures an image, based on the received illuminance information, and a step of recovering the received image using the prediction result.

When the received image includes a plurality of frames, the method may include a step of predicting a degradation model of ambient light when the camera captures an image using the plurality of frames and a step of recovering the received image using the prediction result.

For now, the present disclosure has been described with reference to the exemplary embodiments. It is understood to those skilled in the art that the present disclosure may be implemented as a modified form without departing from an essential characteristic of the present disclosure. Therefore, the disclosed exemplary embodiments may be considered by way of illustration rather than limitation. The scope of the present disclosure is presented not in the above description but in the claims and it may be interpreted that all differences within an equivalent range thereto may be included in the present disclosure.

What is claimed is:

1. An image recovering apparatus, comprising:
a pattern and triggering signal generator configured to:
receive at least one of illuminance information and speed information of an object from a sensor,
determine a random flickering pattern and a triggering signal based on the received information,
output the determined random flickering pattern to a lighting unit, and
output the triggering signal to a camera; and
an image processor configured to, when an image including a motion blur is received from the camera, recover the received image based on the random flickering pattern determined by the pattern and triggering signal generator,
wherein the pattern and triggering signal generator is configured to predict a size of the motion blur based on the received speed information and determine a length of the random flickering pattern in accordance with the predicted size of the motion blur.

2. The image recovering apparatus according to claim 1, wherein when the pattern and triggering signal generator determines the random flickering pattern and the triggering signal based on the speed information, the length of the random flickering pattern is determined in accordance with the speed information.

3. The image recovering apparatus according to claim 1, wherein when the pattern and triggering signal generator determines the random flickering pattern and the triggering signal based on the illuminance information, the random flickering pattern which operates the lighting unit is determined based on influence of ambient light.

4. The image recovering apparatus according to claim 1, wherein the random flickering pattern is a point spread function (PSF).

5. The image recovering apparatus according to claim 4, further comprising:
a database which stores a plurality of PSF patterns,
wherein the PSF pattern determined by the pattern and triggering signal generator is one of the plurality of PSF patterns stored in the database.

6. The image recovering apparatus according to claim 1, wherein the random flickering pattern output to the lighting unit and the triggering signal output to the camera are synchronized.

7. The image recovering apparatus according to claim 1, wherein when the illuminance information is received, the image processor predicts a degradation model of ambient light when the camera captures an image based on the received illuminance information and recovers the received image using a prediction result.

8. The image recovering apparatus according to claim 1, wherein when the received image includes a plurality of frames, the image processor predicts a degradation model of ambient light when the camera captures an image using the plurality of frames and recovers the received image based on a prediction result.

9. The image recovering apparatus according to claim 1, wherein the image processor recovers an image based on the random flickering pattern and a pseudo inverse matrix of the received image.

10. The image recovering apparatus according to claim 1, wherein the pattern and triggering signal generator and the image processor are physically spaced apart from each other.

11. An image recovering method, comprising:
receiving at least one of illuminance information and speed information of an object from a sensor;
determining a random flickering pattern and a triggering signal based on the received information;
outputting the determined random flickering pattern to a lighting unit and outputting the triggering signal to a camera; and
recovering, when an image including a motion blur is received from the camera, the received image based on the determined random flickering pattern,
wherein the determining of the random flickering pattern comprises predicting a size of the motion blur based on the received speed information and determining a length of the random flickering pattern in accordance with the predicted size of the motion blur.

12. The image recovering method according to claim 11, wherein the determining of the random flickering pattern and the triggering signal when speed information is received from the sensor includes:
determining the length of the random flickering pattern in accordance with the speed information.

13. The image recovering method according to claim 11, wherein the determining of the random flickering pattern and the triggering signal when illuminance information is received from the sensor includes:
determining the random flickering pattern which operates the lighting unit based on influence of ambient light.

14. The image recovering method according to claim 11, wherein the recovering of the received image includes:
receiving the illuminance information from the sensor;
predicting a degradation model of ambient light when the camera captures an image, based on the received illuminance information; and
recovering the received image using a prediction result.

15. The image recovering method according to claim 11, wherein the recovering of the received image includes:
predicting a degradation model of ambient light when the camera captures an image using a plurality of frames when the received image includes the plurality of frames; and
recovering the received image using a prediction result.

* * * * *